United States Patent
Muto et al.

(10) Patent No.: US 6,639,730 B2
(45) Date of Patent: Oct. 28, 2003

(54) LENS BARREL

(75) Inventors: Yoshinori Muto, Fussa (JP); Izumi Yamazaki, Akiruno (JP); Takeshi Ito, Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 28 days.

(21) Appl. No.: 10/120,283

(22) Filed: Apr. 10, 2002

(65) Prior Publication Data

US 2002/0149859 A1 Oct. 17, 2002

(30) Foreign Application Priority Data

Apr. 13, 2001 (JP) ........................ 2001-115884

(51) Int. Cl.⁷ .................. G02B 15/14; G03B 17/00
(52) U.S. Cl. ............. 359/694; 359/695; 359/701; 359/823; 396/72
(58) Field of Search ................. 359/694, 695, 359/823, 824, 826, 830, 701; 396/72, 428, 449

(56) References Cited

U.S. PATENT DOCUMENTS 6,147,814 A * 11/2000 Kitazawa et al. ........... 359/699
6,466,379 B2 * 10/2002 Nakane ...................... 359/694
6,469,841 B2 * 10/2002 Nomura et al. ............ 359/694
6,516,148 B1 * 2/2003 Kim et al. .................. 359/694

FOREIGN PATENT DOCUMENTS

| JP | 06-034869 | 2/1994 |
| JP | 09-211294 | 8/1997 |
| JP | 10-253868 | 9/1998 |

* cited by examiner

*Primary Examiner*—Georgia Epps
*Assistant Examiner*—M. Hasan
(74) *Attorney, Agent, or Firm*—Hogan & Hartson LLP

(57) ABSTRACT

A photographing lens apparatus includes a moveable lens frame having a shaft fixing portion to which a shaft for guiding movements of another moveable lens frame is affixed, and a lens retaining frame mounted to the moveable lens frame that integrally retains a plurality of lenses of different apertures and a predetermined diaphragm member disposed among the plurality of lenses. The shaft fixing portion is disposed such that at least a portion thereof overlaps a projected plane defined by a large aperture lens among the plurality of lenses retained by the lens retaining frame as viewed from a front face, and is also disposed in the vicinity of an outer peripheral portion of a small aperture lens among the plurality of lenses retained by the lens retaining frame.

12 Claims, 9 Drawing Sheets

LENS BARREL

This application claims benefit of Japanese Application No. 20001-115884 filed in Japan on Apr. 13, 2001, the contents of which are incorporated by this reference.

BACKGROUND OF THE INVENTION

1. Field of the Invention

The present invention relates to a photographing lens apparatus, and more particularly to a photographing lens apparatus equipped with a lens barrel that includes multiple lenses and multiple frame members respectively retaining the multiple lenses, and a shift mechanism that appropriately moves part of the frame members in an optical axis direction.

2. Description of the Related Art

In recent years, electronic still cameras (hereafter referred to as "electronic cameras") have become widely popular. An electronic camera is equipped with an electronic photographing device (hereafter referred to as "photographing device" that receives a subject image that is formed on a specified light receiving surface by a photographing lens apparatus including a plurality of optical elements, and records image signals of still pictures outputted from the photographing device, and picture data corresponding to the image signals in a recording media by means of a predetermined recording device.

A conventional electronic camera is equipped with a photographing lens apparatus that performs a zooming operation and a focusing operation by moving part of the frame members that retain multiple lenses in an optical axis direction prior to a photographing operation.

Also, some of the known conventional electronic cameras are equipped with a barrel retracting type photographing lens apparatus that stores part of the photographing lens apparatus, for example, a photographing lens barrel thereof inside the electronic camera when photographing operations are not performed, for example, when the camera is being carried or stored.

In a photographing lens apparatus, in which multiple lenses retained by multiple frame members are appropriately moved in a direction along its optical axis to perform a zooming operation, a focus adjustment (AF) operation or a barrel retracting operation, relative deviations may occur among arrangements of the optical axes of the lenses retained by the respective moveable frame members as the frame members are moved. When deviations in the optical axes occur, substantial deteriorations in the optical performance, such as, deformations of subject images that are focused, lowered resolutions of obtained images and the like may occur. Therefore, in the photographing lens apparatus having moveable frame members (hereafter referred to as "moveable frames"), it is necessary to restrain deviations in the optical axes that may occur when the frame members move.

A conventional mechanism to move the frame members in a photographing lens apparatus includes for example, a combination of a shaft disposed in parallel with the optical axis and a bearing section (sleeve) engaged with the shaft to achieve desired shift amounts and precision. In the photographing lens apparatus, the shaft is fixed to one of a fixed frame that does not move and a moveable frame that is moveable with respect to the fixed frame, and a bearing section, which engages and guides the moveable frame in a linear advancement direction, is provided on the other (the frame member to which the shaft is not fixed).

An engaging section is provided at one place on one of the fixed frame and the moveable frame to restrict rotation thereof with respect to the other frame member, and a section to be engaged is provided on the other frame member at a location corresponding to the engaging section, which engages the engaging section to cause a state in which the fixed frame and the moveable frame do not rotate relatively with respect to each other. By the structure described above, the conventional photographing lens apparatus practically achieves a sufficient level of suppressing deviations in the optical axes among the mutual lenses.

When the conventional photographing lens apparatus uses the system in which the shaft and the bearing section are disposed on the fixed frame and the moveable frame, respectively, the frame members on which the shaft and the bearing section are disposed need to be manufactured and assembled with high precision. In other words, when the shaft is assembled to the frame member, they must be securely attached to the frame member such that the axial direction of the shaft coincides with a direction along the optical axis of the lens that are retained by the frame member on which the shaft is attached.

To secure such an assembly accuracy of the shaft, a mounting section therefore needs to be provided with a sufficient size, wherein the mounting section is provided at a specified location of the frame member on which the shaft is mounted. However, when the shaft mounting section is made sufficiently large, the size of the frame member unavoidably becomes larger, and therefore it is practically difficult to provide a photographing lens apparatus that realizes miniaturization without deteriorating its optical performance.

SUMMARY OF THE INVENTION

A photographing lens apparatus in accordance with the present invention includes an object lens retaining frame that integrally retains a plurality of lenses of different apertures and a diaphragm member disposed between a lens of a large aperture located at a front most position and a lens of a smaller aperture located at a position in the rear of the front most position among the plurality of lenses of different apertures, a first moveable lens frame that is moveable in a photographing optical axis direction and has a mounting section to which the object lens retaining frame is mounted and a shaft fixing section to which a shaft extending in parallel with the photographing optical axis direction is affixed, and a second moveable lens frame having a sleeve that freely, slidably engages the shaft and allows a group of moveable lenses different from the plurality of lenses of different apertures to move in the photographing optical axis direction. The shaft fixing section has at least a portion overlapping a projected plane defined by an external shape of the lens of a larger aperture retained by the object lens retaining frame as viewed from a front face side of the lens of a large aperture and is provided at a specified location within a region adjacent to an outer peripheral section of the lens of a smaller aperture.

Accordingly, in the photographing lens apparatus in accordance with the present invention, attention is paid to an aspect in which the moveable lens frame is equipped integrally with the plurality of lens of different apertures. By so doing, differences in the lens apertures resulting from the plurality of lenses are utilized to thereby provide the shaft fixing section on the inner side of the moveable lens frame (the lens retaining frame and the lens frame retaining member), and further the diaphragm member is provided between the lens of a large aperture and the lens of a smaller aperture among the plurality of lenses of different apertures. As a result, light fluxes incident upon the plurality of lenses are controlled, and at the same time the shaft is shielded such that it cannot be visually recognized when viewed from the front face side of the apparatus.

Accordingly, miniaturization of the apparatus can be readily achieved without affecting the quality of subject images; component parts within the apparatus are not visually recognized when viewed from the front side of the photographing lens apparatus; and unnecessary light incidence or internal reflection are suppressed, such that the optical performance of the apparatus is not deteriorated, and the degree of freedom in designing the external appearance is high.

The objects and advantages of the present invention will become further apparent from the following detailed explanation.

DESCRIPTION OF THE PREFERRED EMBODIMENTS

Aspects of the embodiments of the present invention will be described with reference to the drawings.

An electronic camera to which a photographing lens apparatus in accordance with a first embodiment of the present invention will be described.

Figure 1:
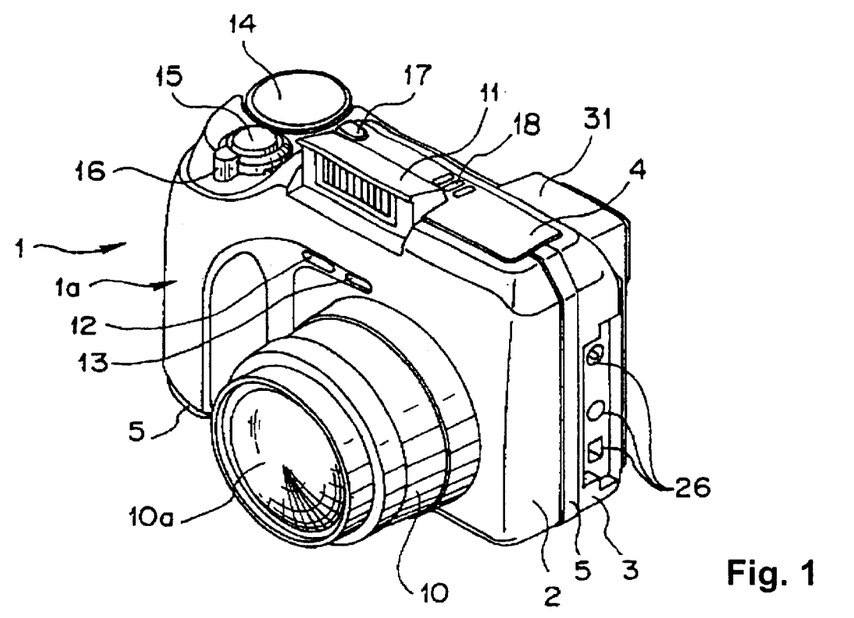
FIG. 1 shows a perspective view of an electronic camera on its front side in which a photographing lens apparatus in accordance with a first embodiment of the present invention is applied.
Figure 2:
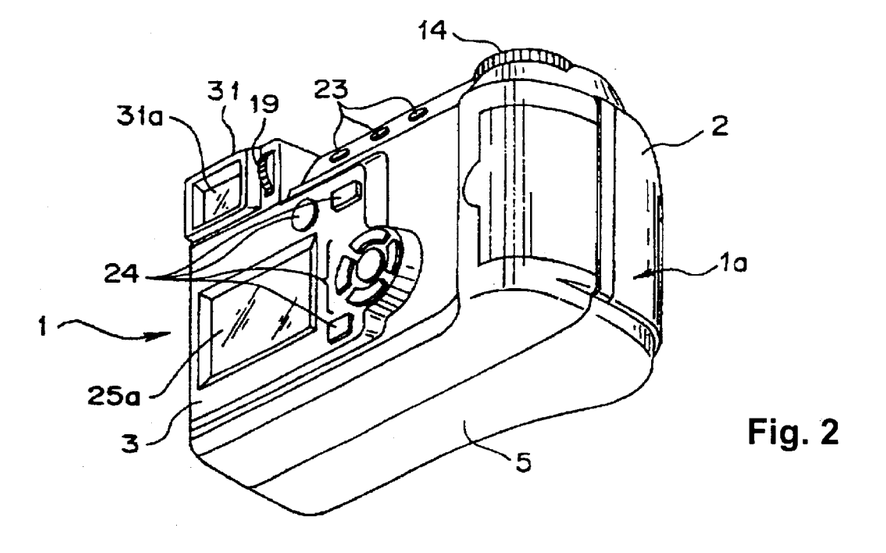
FIG. 2 shows a perspective view of the electronic camera on its rear side of FIG. 1.

FIGS. 1 and 2 show an electronic camera in which a photographing lens apparatus in accordance with a first embodiment of the present invention is applied; wherein FIG. 1 is a perspective view of the electronic camera showing its front side, and FIG. 2 is a perspective view of the electronic camera showing its rear side.

The electronic camera 1 focuses a subject image, which is formed based on a light flux coming from a subject to be photographed (hereafter referred to as a subject light flux) and passing through a plurality of photographing lenses 10a, on a light receiving surface of a photographing element of a charge coupled device (not shown in FIG. 1 or FIG. 2, but see an element indicated by reference numeral 39 in FIG. 4), and uses the photoelectric conversion action by the photographing element (39) to obtain the subject image as still picture data, and records the still picture data in a predetermined recording media (not shown).

Furthermore, the electronic camera 1 is equipped with a picture display apparatus 25a that reads the still picture data recorded in the predetermined recording media in a specified format, performs predetermined signal processing on the picture data read out, and displays the same as a picture.

Also, the electronic camera 1 may be equipped with a microphone unit (not shown in FIG. 1 or FIG. 2, and see the element indicated by reference numeral 32 in FIG. 9) on the inside thereof for voice input such that voice data can be obtained for a predetermined period of time at the same time when a photographing recording operation is taking place or for a predetermined period of time after a photographing recording operation. Voice data obtained by the microphone unit can be recorded in a specified format in the same recording media (not shown) that records the still picture data.

It is noted that the present electronic camera 1 uses, for example, a card shaped non-volatile recoding media that has a built-in semiconductor memory. Other types of memory devices could also be used with the electronic camera 1 or in the electronic camera 1.

The electronic camera 1 includes a housing body that is formed from a front cover 2 that mainly covers the front face of the camera 1, a rear cover 3 that mainly covers the rear face, an upper cover 4 that covers a part of the upper face (only shown in FIG. 1), and a main body member 5 that covers the lower face and serves also as a frame member that retains components inside the electronic camera 1.

A photographing lens apparatus 10 that retains the photographing lenses 10 is disposed at a specified location slightly shifted to the right of the front face of the electronic camera 10 as viewed toward the front face thereof, as shown in FIG. 1.

The photographing lens apparatus 10 is formed from a plurality of lenses and frame members that retain the plurality of lenses. The photographing lens apparatus 10 converges a light flux coming from a subject with the plurality of lenses and forms a picture including an image of the subject formed by the lenses that transmit the light flux on a predetermined light receiving surface.

Figure 7:
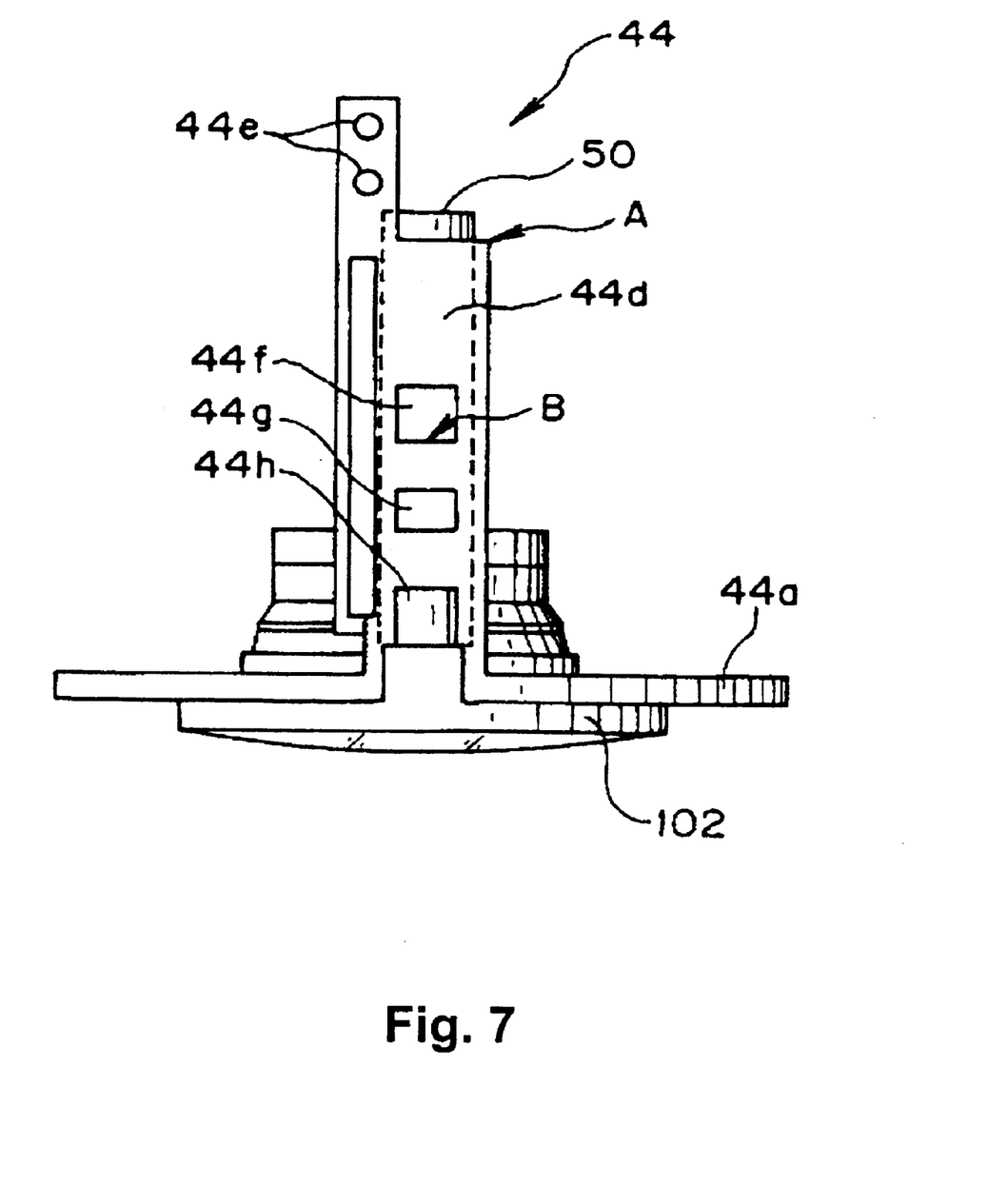
FIG. 7 shows an enlarged view of a second moveable lens frame alone taken out of the photographing lens apparatus in accordance with the first embodiment as viewed in a direction indicated by an arrow X in FIG. 3.
Figure 8:
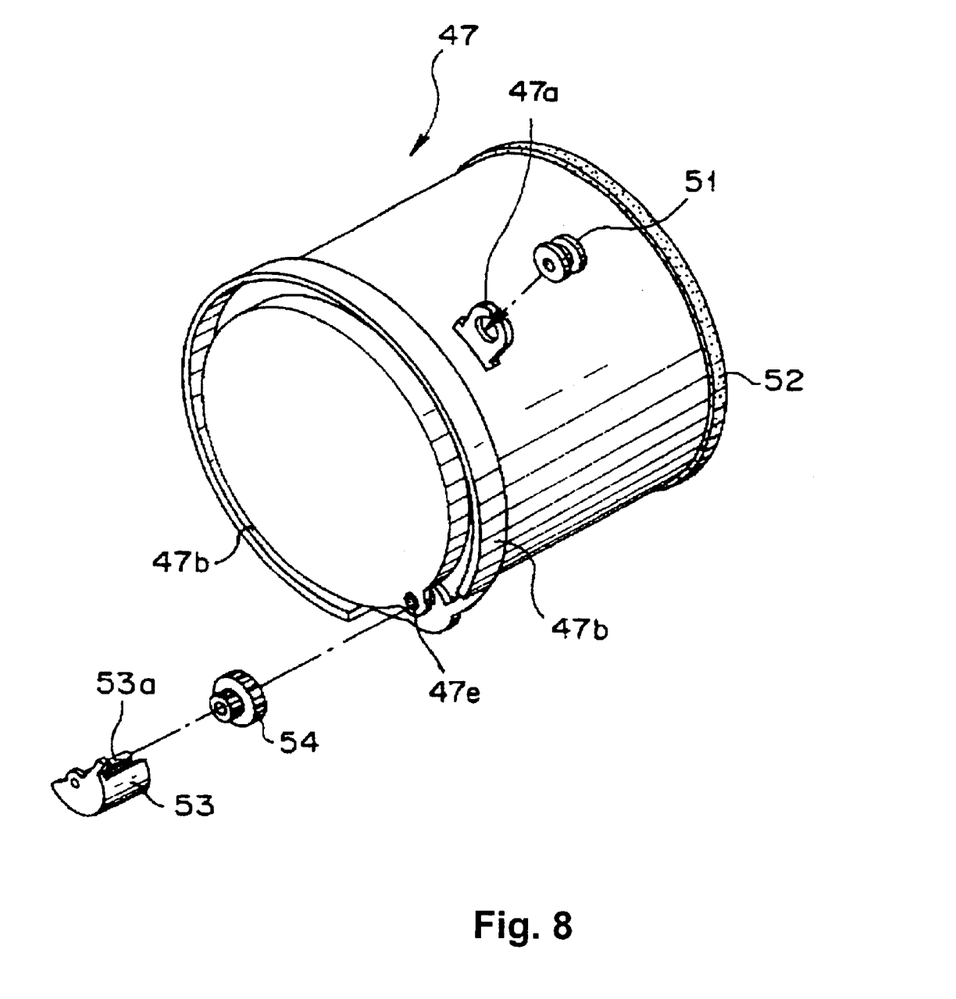
FIG. 8 shows a perspective view of a fixed frame alone taken out of the photographing lens apparatus in accordance with the first embodiment with a view of an area adjacent to a rear end thereof.

Details of the structure of the photographing lens apparatus 10 will be described below with reference to FIGS. 31–8. It is noted that the photographing lens apparatus 10 of the present embodiment is equipped with a high magnification zoom lens that can set its magnification, for example, at about ×10 magnification.

In an area adjacent generally to the center of the front face of the electronic camera 1 and adjacent to the photographing lens apparatus 10, there are provided a light receiving section 12 that receives an instruction signal light from a remote control apparatus (e.g., a remote control unit that is not shown) that is provided independently of the electronic camera 1 and a self-timer light emitting section 13 that notifies an operation of a photographing operation delay apparatus (e.g., a self-timer apparatus that is not shown) that is provided on the inside of the electronic camera 1.

The instruction signal light received by the remote control light receiving section 12 is converted by a predetermined device to an electric signal representing a specified instruction; and the instruction signal is transferred to a predetermined control circuit (not shown) within the electronic camera 1, whereby an operation according to the instruction signal is performed.

Also, a flash emitting apparatus (a flash apparatus) 11 composed of a light emitting section is provided at an upper edge section of a generally central area of the front face of the electronic camera 1. The light emitting section of the flash emitting apparatus 11 may be stored in the housing body when it is not used, and therefore a specified operation needs to be performed when the flash emitting apparatus 11 is used. The specified operation may be an operation to depress a light emitting section pop-up button (a strobe light pop-up button) 17 that is an operational member provided on the top face of the electronic camera 1. By this operation, the light emitting section pops out from the storage position within the housing body, and is placed in a predetermined pop-up position. In the pop-up position, the light emitting section can flash. The flash emitting apparatus 11 of the electronic camera 1 adopts a pop-up type structure in the manner described above. The state indicated in FIG. 1 is a state in which the light emitting section of the flash emitting apparatus 11 is disposed in the predetermined pop-up position that protrudes from the housing body.

When the light emitting section of the flash emitting apparatus 11 is in the storage position, a part of the light emitting section forms a part of the upper cover 4 (see FIG. 1).

A microphone aperture section 18, which defines an aperture for voice input to the microphone unit (not shown in FIG. 1 or FIG. 2, and see the element indicated by reference numeral 32 in FIG. 9), is provided at a specified location in the rear of the light emitting section of the flash emitting apparatus 1, as shown in FIG. 1. The microphone aperture section 18 is formed from a plurality of apertures that penetrate through the upper cover 4, and the microphone unit is disposed within the housing body at a specified location opposite the microphone aperture section 18.

Various operational members are located in a region closer to one end of the upper face of the electronic camera 1. More specifically, a function switching dial 14 for selecting and switching functions of the electronic camera 1, a shutter release button 15 that generates a signal for starting the photographing operation, and a zoom lever 16 for generating a signal to perform a zooming operation of the photographing lenses 10a are located at predetermined locations, respectively.

The function switching dial 14 is pivotally supported in a manner freely rotatable within a range of a specified rotational angle with respect to the upper face of the housing body of the electronic camera 1. The function switching dial 14 may be optionally rotated within the specified range to match any of indexes (not shown) representative of various functions provided by means of printing or carving on an upper face of the dial with an index (not shown) formed at a specified location of the upper face of the electronic camera 1. This operation permits the desired function to be selected.

The shutter release button 15 and the zoom lever 16 are disposed coaxially with one another. The shutter release button 15 generates, by a first stage depressing operation, an instruction signal for executing a focus adjusting operation and a light measuring operation, and generates, by a second stage depressing operation, an instruction signal for executing an exposure operation.

The zoom lever 16 is disposed in a manner freely rotatable within a range of a specified rotational angle. Rotational operation of the zoom lever 16 generates an instruction signal for executing a zooming operation of the photographing lenses 10a. Then, the instruction signal is transferred to a predetermined control circuit (not shown) within the electronic camera 1, and the plurality of frame members that retain the plurality of lenses disposed within the photographing lens apparatus 10 are moved respectively by appropriate amounts in predetermined directions based on the control performed by the control circuit. By this operation, a desired focus distance is set.

A grip section 1a, which may be held by the user who uses the electronic camera 1, is formed in one end section of the housing body of the electronic camera 1 on the side where the operational members of the function switching dial 14, the shutter release button 15 and the zoom lever 16 are disposed, as shown in FIGS. 1 and 2. A power supply storage section (not shown) is formed within the grip section 1a such that power supply batteries (not shown) that serve as a main power supply for the electronic camera 1 can be freely loaded in or unloaded from the power supply storage section.

As a power supply for the electronic camera 1, one with a relatively large capacity, such as, for example, four rechargeable batteries each being formed in the same shape as an AA battery or two battery packs each being formed in a shape similar to two AA batteries arranged side by side, may be used.

A viewfinder apparatus 31 is disposed in the housing body at a specified location closer to the other end section of the housing body of the electronic camera 1 (adjacent to an end section on the opposite side of the grip section 1a). A viewfinder eyepiece 31a for viewing a viewfinder picture that can be observed by the viewfinder apparatus 31 is disposed at a predetermined location corresponding to the viewfinder apparatus 31 on the side of the rear face of the electronic camera 1.

The viewfinder apparatus 31 of the electronic camera 1 adopts, for example, a so-called electronic viewfinder apparatus (EVF apparatus) that is equipped with a small sized liquid crystal display apparatus on the inside thereof in order to accommodate high magnification zoom lenses without using a complex linkage system.

A diopter adjustment dial 19, which composes part of a diopter adjustment system (not shown) for adjusting the diopter of the viewfinder eyepiece 31a such that a viewfinder picture, in other words, a display section (not shown) of the viewfinder apparatus 31 can be observed in an appropriate focused state, is provided adjacent to the viewfinder eyepiece 31a.

The diopter adjustment dial 19 is an operational member that is linked to the diopter adjustment system to move the viewfinder eyepiece 31a in a direction of its optical axis. By a rotational operation of the diopter adjustment dial 19 within a predetermined range, the diopter can be adjusted within a predetermined range.

A picture display apparatus 25a formed from a liquid crystal display apparatus (LCD) that displays pictures is provided in the rear face of the electronic camera 1 with its display surface facing toward the exterior, in other words, toward the rear face side of the electronic camera 1.

During operation, the picture display apparatus 25a can normally display pictures based on picture data that is generated through actions of the photographing element 39 (not shown in FIG. 1 or FIG. 2, and see FIG. 4) based on subject pictures that are formed by means of the photographing lenses 10a. Accordingly, the picture display apparatus 25a can also be used as a viewfinder apparatus.

Also, during a reproducing operation, the picture display apparatus 25a can display pictures based on picture data that have already been photographed and recorded in a predetermined recording media (not shown). Accordingly, the picture display apparatus 25a can also function as a picture reproduction apparatus.

A plurality of operational members 24 are provided at predetermined places adjacent to the circumference of the picture display apparatus 25a. Also, a plurality of operational members 23 are provided closer to the upper edge of the rear face of the electronic camera 1 adjacent to the diopter adjustment dial 19.

The multiple operational members 23 and 24 are operational members that may be operated in predetermined manners according to desired functions to generate various control signals during the picture recording operation (photographing operation) and the picture reproducing operation by the electronic camera 1.

It is noted that the operations and settings that can be attained by the operational members 23 and 24 are not directly related to the present invention, and therefore their detailed description is omitted.

A plurality of connection terminals 26 (see FIG. 1) for electrically connecting the electronic camera 1 to an external power supply or external equipment are provided on a side face on the opposite side of the side face where the grip section la of the electronic camera 1 is provided.

Details of the photographing lens apparatus 10, which may be applied to the electronic camera 1 thus structured, will be described below with reference to FIGS. 3–8.

Figure 3:
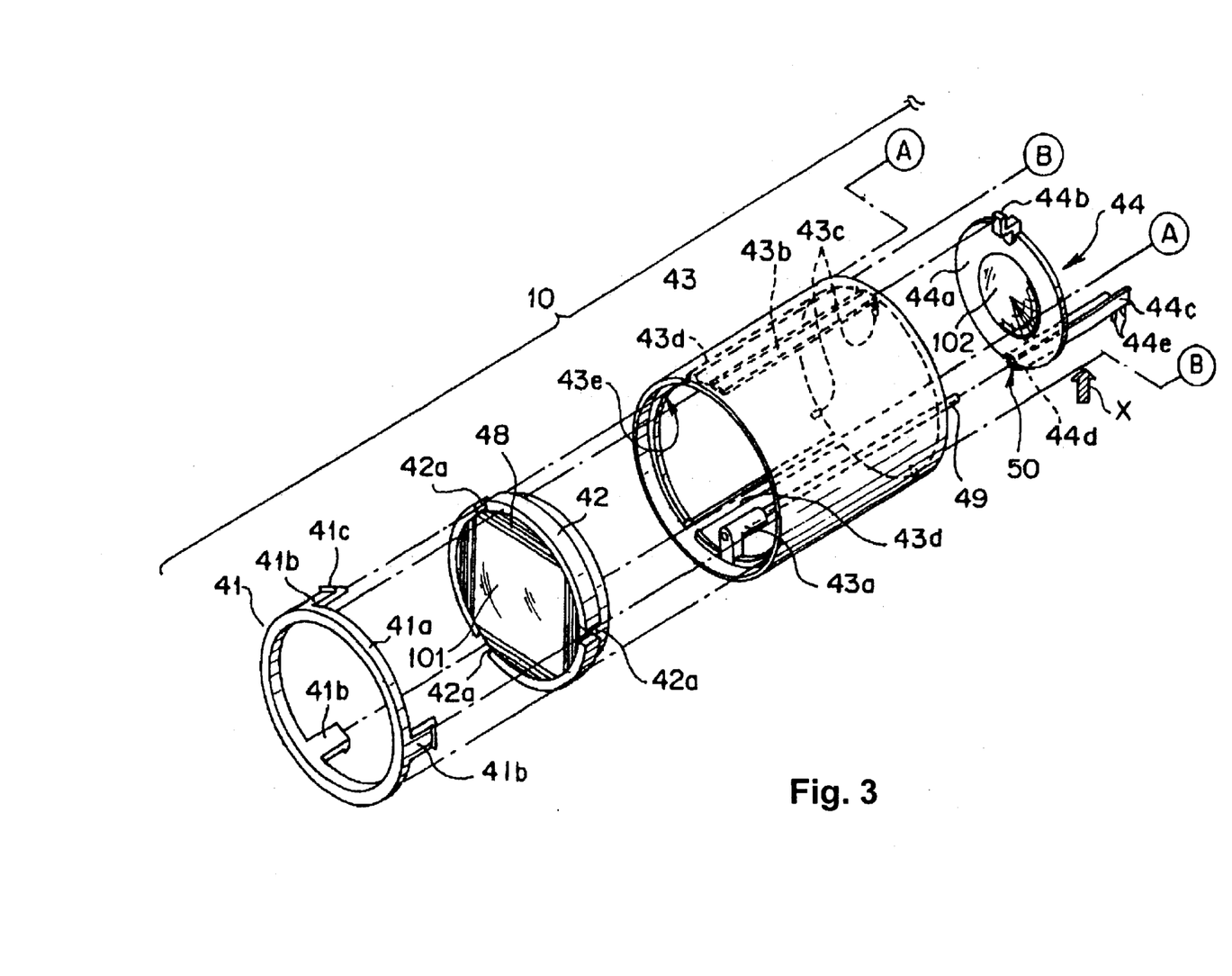
FIG. 3 schematically shows an exploded perspective view of components in a front half portion of key components that compose the photographing lens apparatus in accordance with the first embodiment.
Figure 4:
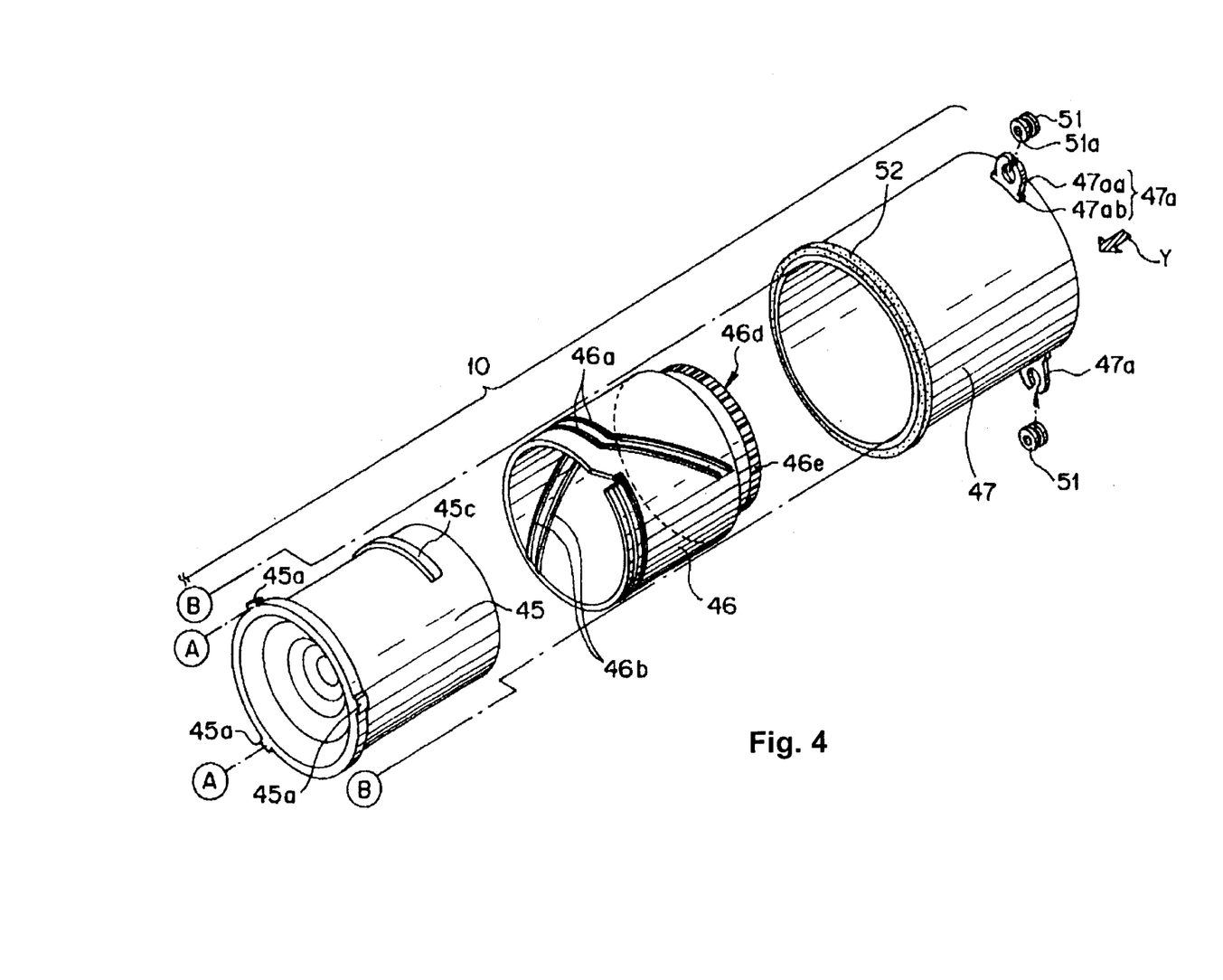
FIG. 4 schematically shows an exploded perspective view of components in a rear half portion of the key components that compose the photographing lens apparatus in accordance with the first embodiment.

FIGS. 3 and 4 schematically show exploded perspective views of a structure of the photographing lens apparatus in accordance with a first embodiment of the present invention. Here, FIG. 3 shows a front ring, an object lens retaining frame, a first moveable lens frame and a second moveable lens frame among key components of the photographing lens apparatus of the present embodiment. Also, FIG. 4 shows an exploded perspective view of a lens frame holder, a cam frame and a fixed frame among the key components of the photographing lens apparatus of the present embodiment.

It is noted that FIGS. 3 and 4 do not include illustrations of a plurality of lenses that are retained by the respective frame members that compose the photographing lens apparatus and various component elements disposed at the respective frame members in order to avoid complexities of the illustrations being too complex.

Figure 5:
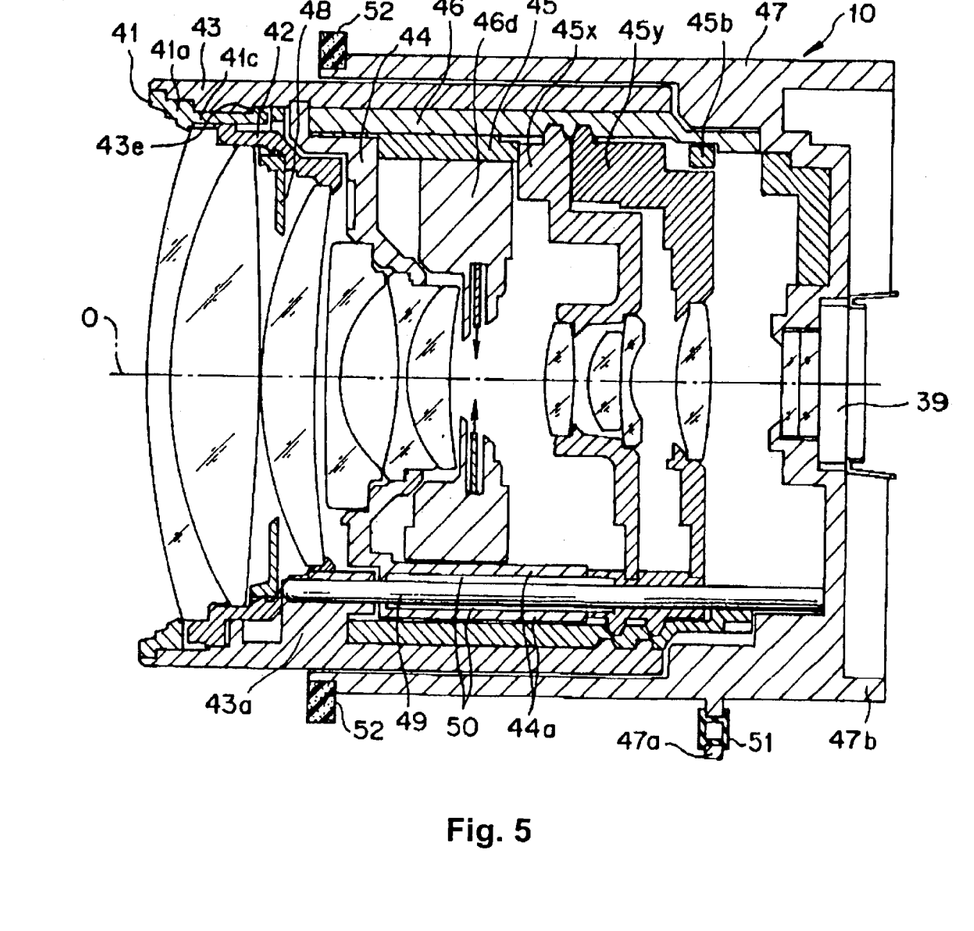
FIG. 5 schematically shows a cross-sectional view of a composition in a state in which the photographing lens apparatus in accordance with the first embodiment is in a retracted position.
Figure 6:
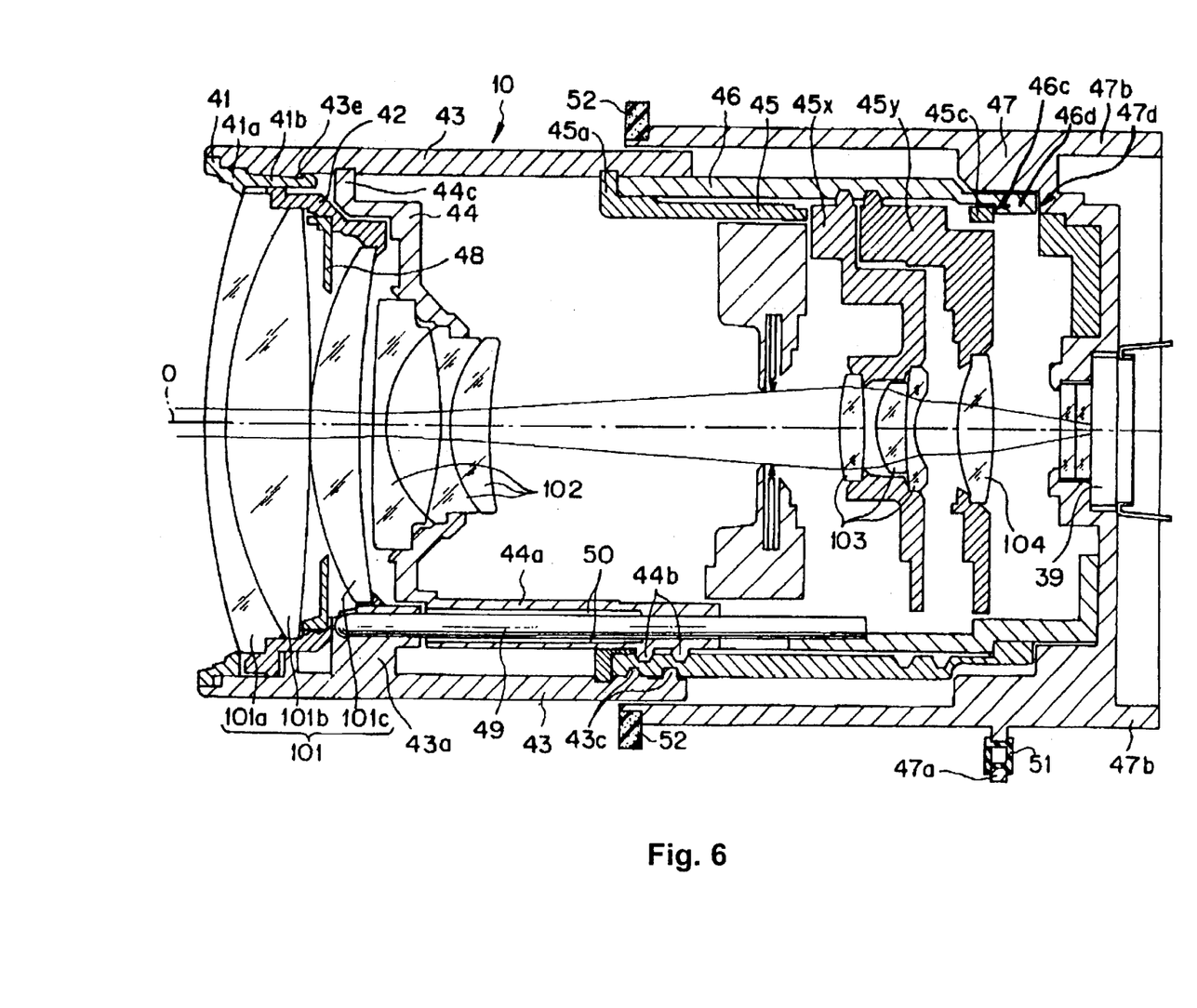
FIG. 6 schematically shows a cross-sectional view of a composition in a state in which the photographing lens apparatus in accordance with the first embodiment is in a photographing state at a short focal length (wide angle) position.

FIGS. 5 and 6 schematically show cross-sectional views of the photographing lens apparatus in accordance with the present embodiment.

FIG. 5 shows a state in which the respective moveable frames are stored in a retracted position, and FIG. 6 shows a setup state in which the respective moveable frames are in a photographable, short focal length (wide angle) end position.

The photographing lens apparatus 10 of the present embodiment is formed from a plurality of lens retaining frames that independently retain a plurality of lens groups for respectively focusing and forming picture of the subject, a first moveable lens frame 43 and cam frame 46 that define a moving mechanism for moving the plurality of lens retaining frames 42, 44, 45x and 45y by appropriate amounts in a direction along the optical axis O, a lens frame holder 45 that is disposed within the cam frame 46, and freely, moveably holds the third moveable lens frame 45x and the fourth moveable lens frame 45y in a direction along the optical axis O and includes an AF motor, a zooming motor and a shutter diaphragm unit fixed thereto, a fixed frame 47 that has a CCD photographing element 39 fixed thereto and fixedly supports the photographing lens apparatus 10 inside the electronic camera 1, and a front ring 41 disposed at the end most section of the photographic lens apparatus 10. The plurality of lens retaining frames include an object lens retaining frame 42, a second moveable lens frame 44, a third moveable lens frame 45x and a fourth moveable lens frame 45y. The plurality of lens groups include a first group of lenses 101, a second group of lenses 102, a third group of lenses 103 and a fourth group of lenses 104.

Here, the object lens retaining frame 42, the second moveable lens frame 44, the third moveable lens frame 45x, the fourth moveable lens frame 45y and the first moveable lens frame 43 are moveable frames that are moveable in the optical axis direction. When attached to the first moveable lens frame 43, the object lens retaining frame 42 moves in one piece with the first moveable lens frame 43.

The front ring 41 is disposed at the front most section of the photographing lens apparatus 10 on the side of the front face thereof. The front ring 41 is formed from a circular ring section 41a, and three retaining arm sections 41b that are formed in one piece with the circular ring section 41a and provided generally at equal intervals along the outer circumference of the circular ring section 41a. The retaining arm sections 41b are provided in a manner to extend rearwardly from the circular ring section 41a as a base, and a hook shaped claw section 41c is formed at each of the end sections thereof. The claw sections 41c are retained by sections to be retained 43e of the first moveable lens frame 43 through the object lens retaining frame 42, whereby the ring 41 is attached to a predetermined position in the photographing lens apparatus 10. By virtue of forming in such a two-piece structure, good assembling workability is realized without enlarging the aperture of the first moveable lens frame 43.

Further, since the front ring 41 is attached to a predetermined location on the front face side of the photographing lens apparatus 10, mounting screws that may otherwise be exposed on the front face side of the object lens retaining frame 42 are shielded. In other words, the front ring 41 functions as an ornamental device that provides the photographing lens apparatus 10 with a nice external appearance.

The object lens retaining frame 42 is a frame member that is structured to retain the first group of lenses 101 as well as to attach the first moveable lens frame 43 at a predetermined location. Predetermined screw holes are provided in an outer circumferential area of the object lens retaining frame 42. Predetermined screw receiving sections are provided in the inner circumference of the first moveable lens frame 43 at locations corresponding to the screw holes adjacent to an end section thereof. By this structure, the object lens retaining frame 42 is fixed by a screw coupling to the first moveable lens frame 43 adjacent to the end section thereof.

In a state in which the object lens retaining frame 42 and the first moveable lens frame 43 are coupled together by screws, the front ring 41 described above is inserted from the front face side of the object lens retaining frame 42, and the claw sections 41*c* of the front ring 41 are retained by the sections to be retained 43*e* of the first moveable lens frame 43. For this reason, recessed sections 42*a* through which the retaining arm sections 41*b* of the front ring 41 can pass are provided on the outer circumferential surface of the object lens retaining frame 42 at specified locations corresponding to the retaining arm sections 41*b*. Since head sections of the mounting screws are shielded by the front ring 41, the screw heads cannot be seen from the outside.

The first group of lenses 101 retained by the object lens retaining frame 42 includes three lenses, which are a first lens 101*a*, a second lens 101*b* and a third lens 101*c* arranged in this order from the front face (object lens) side of the photographing lens apparatus 10. The closer the lenses are to the front side, the larger the apertures.

A diaphragm member 48 is disposed between the second lens 101*b* and the third lens 101*c*. The diaphragm member 48 suppresses incidence of rays of harmful light unnecessary to subject pictures to be formed among the light flux that enters the photographing lens apparatus 10 from outside, and controls the generation of flares. Also, the diaphragm member 48 shields internal components, for example, a shaft to be described below, that can be seen from the front face side of the photographing lens apparatus 10, such that the internal components cannot be seen. The object lens retaining frame 42 includes a frame portion that supports the third lens 101*c*, wherein a part of the frame portion is cut out. A shaft fixing section 43*a* to be described below is disposed at the cut section.

The first moveable lens frame 43 is a lens retaining member that is formed from a generally cylindrical sleeve member. As described above, the object lens retaining frame 42 is affixed by screw coupling to the first moveable lens frame 43 at its inner circumferential surface adjacent to the end section thereof so as to form an integral body.

The first moveable lens frame 43 is provided with a shaft fixing section 43*a* integrally formed at a predetermined position on the inside thereof. The shaft fixing section 43*a* fixedly supports a shaft 49 that is provided to guide movements of the second moveable lens frame 44 in a direction along the optical axis.

The shaft 49 is affixed to the shaft fixing section 43*a* in a manner that the axial direction of the shaft 49 extends along the optical axis. One end of the shaft 49 is firmly affixed to a predetermined area of the shaft fixing section 43*a* by press fitting or bonding. By this structure, the shaft 49 is disposed inside the first moveable lens frame 43 in the form of a cantilever, but the shaft 49 is securely disposed by pressure fitting or bonding in a manner to extend in a direction along the optical axis O. As a result, a predetermined moveable lens frame (the second moveable lens frame 44) guided by the shaft 49 is maintained at a high moving accuracy in the optical axis.

The shaft fixing section 43*a* is disposed such that at least a part thereof overlaps a projected plane of the first lens 101*a* (a large aperture lens) as viewed from its front face side among the first group of lenses 101 composed of a plurality of lenses retained by the object lens retaining frame 42 (a moveable lens frame), and at the same time the shaft fixing section 43*a* is provided adjacent to an outer peripheral section of the third lens 101*c* (a small aperture lens) among the plurality of lenses retained by the object lens retaining frame 42.

A first guide groove 43*b* is formed on the inner circumferential surface of the first moveable lens frame 43 at a position opposing to the shaft fixing section 43*a*. The first guide groove 43*b* is a straight groove that linearly extends from a predetermined location generally adjacent to an end section of the inner circumferential surface of the first moveable lens frame 43 to a rear edge section thereof. A first guide arm 44*b* of the second moveable lens frame 44 freely, slidably engages the groove. By this structure, the first guide groove 43*b*, together with the above-described shaft 49, guides movements of the second moveable lens frame 44 in a direction along the optical axis. As a result, the second moveable lens frame 44 is allowed to move only in the optical axis direction by the shaft 49 and the first guide groove 43*b*.

A plurality of cam pins 43*c*, which engage cam grooves 46*a* formed on the outer circumferential surface of the cam frame 46, are provided at predetermined locations on the inner circumferential surface of the first moveable lens frame 43 adjacent to the rear edge section thereof. The cam pins 43*c* are provided at three predetermined locations generally equally spaced from one another on the inner circumferential surface of the first moveable lens frame 43. Each of the cam pins 43*c* disposed at each of the locations includes a pair of two pins.

Also, second guide grooves 43*d*, which guide movements with respect to the lens frame holder 45, are formed on the inner circumferential surface of the first moveable lens frame 43 at three predetermined locations generally equally spaced from one another. Three guide sections 45*a* of the lens frame holder 45 freely, slidably engage the second guide grooves 43*d*. By this structure, the second guide grooves 43*d* guides movements of the first moveable lens frame 43 in a direction along the optical axis with respect to the lens frame holder 45, and also prevents rotations of the first moveable lens frame 43 about the optical axis.

The second moveable lens frame 44 is formed from a circular lens retaining section 44*a* that fixedly retains the second group of lenses 102 composed of three lenses, a first guide arm 44*b* that is integrally formed with the lens retaining section 44*a* at a predetermined location in an outer peripheral section thereof and slidably engages the first guide groove 43*b* of the first moveable lens frame 43, and a second guide arm 44*c* that extends rearwardly from a predetermined position of the outer peripheral section of the lens retaining section 44*a* and in a direction along the optical axis of the lenses and supports the shaft 49.

A sleeve bearing 44*d* is provided at a base end section of the second guide arm 44*c* and has an aperture section that penetrates through the base end section in a direction along the optical axis of the lenses. A metal sleeve 50 is fitted in the sleeve bearing 44*d*. The sleeve 44*d* is bonded to the sleeve bearing 44*d* by adhesive or is attached by other means. By passing the shaft 49 through the sleeve 50, the second moveable lens frame 44 is supported in a manner moveable in the optical axis direction. The sleeve bearing 44*d* is a bearing section to which the sleeve 50 is fixedly adhered by adhesive, and forms a lens frame guiding means together with the shaft 49 and the sleeve 50 for guiding a predetermined moveable lens frame (the second lens frame 44) in a predetermined direction. The sleeve 50 is provided for smoothly moving the second moveable lens frame 44 with high precision.

Also, two cam pins 44e facing toward the outer face side are provided at a free end section of the second guide arm 44c. The cam pins 44e engage a cam groove 46b formed in the inner circumferential surface of the cam frame 46.

Details of the structure of the second moveable lens frame 44 will be described below. FIG. 7 shows an enlarged view of the second moveable lens frame 44 taken out alone, and indicates a state thereof as viewed in a direction of the arrow X shown in FIG. 3.

As described above, at the base end section of the second guide arm 44c of the second moveable lens frame 44, the sleeve bearing 44d penetrating through the base end section in a direction along the optical axis of the lenses is provided. The metal sleeve 50 is fitted in the sleeve bearing 44d, and the sleeve 50 is firmly affixed by adhesive at a predetermined location within the sleeve bearing 44d.

Three windows 44f, 44g and 44h defining opening sections are opened in the sleeve bearing 44d, as shown in FIG. 7. These windows 44f, 44g and 44h penetrate through the sleeve bearing 44d and reach the inside of an aperture section thereof where the sleeve 50 is disposed. As the sleeve 50 is disposed in the sleeve bearing 44d, part of the outer circumferential surface of the sleeve 50 can be exposed and seen through these windows 44f, 44g and 44h.

The first window 44f among the three windows serves as an adhesive injection window for injecting adhesive for fixedly bonding the sleeve 50 at a predetermined location of the sleeve bearing 44d.

The second window 44g serves as an adhesive observation window that allows a visual confirmation of the condition of how the injected adhesive penetrates.

The third window 44h is a window section that is formed by cutting one end face of the sleeve bearing 44d. An end face of the sleeve 50 that is inserted in the sleeve bearing 44d is disposed such that it generally flushes with an end face of the sleeve bearing 44d. The window 44h prevents the adhesive from spreading to the end face of the sleeve 50 as the adhesive injected in a gap between the sleeve bearing 44d and the sleeve 50 penetrates through the gap.

The first window 44f is disposed adjacent to a generally central portion of the sleeve bearing 44d in its axial direction at a location slightly separated from a first adhesive injection section A. The first window 44f serves as a second adhesive injection section B.

The second window 44g, which is slightly smaller in size than the first window 44f, is provided at a predetermined location separated at a specified distance from the first window 44f. The third window 44h is provided at a predetermined location separated at a specified distance from the first window 44f.

In order to fixedly bond the sleeve 50 to the sleeve bearing 44d of the second moveable lens frame 44, the sleeve 50 is first inserted in the sleeve bearing 44d, and then adhesive is injected by the following procedure. Although not shown, prior to bonding the sleeve 50, a reference shaft jig that corresponds to the shaft 49 is inserted in the sleeve 50 to suppress deviations in the optical axes of the first group of lenses 101 and the second group of lenses 102 to thereby position the sleeve 50.

The worker, who would assemble the photographing lens apparatus 10, places the second moveable lens frame 44 in a state in which the sleeve 50 is inserted in the sleeve bearing 44d on a work table in a manner that the second group of lenses 102 is faced downwardly, as shown in FIG. 7. In this state, a predetermined amount of adhesive is first injected through the first injection section indicated by mark A shown in FIG. 7. Here, the first injection section A denotes a gap between the sleeve 50 and the sleeve bearing 44d at a section on the outer circumferential surface of the sleeve 50.

The worker then injects a predetermined amount of the same adhesive through the second injection section B located adjacent to a lower edge section of the first window 44f. As a result, the adhesive injected through the injection sections A and B penetrates downwardly through the gap between the sleeve 50 and the sleeve bearing 44d. When the adhesive reaches the second window 44g and advances into a state in which the adhesive can be viewed through the window 44g, the worker coats a specified hardening agent to the adhesive that has penetrated to the second window 44g. The adhesive starts hardening by the action of the hardening agent, and the sleeve 50 is securely bonded with an appropriated amount of the adhesive, and the adhesive would not leak out at the lower end face of the sleeve bearing 44d.

The lens frame holder 45 is formed to have a cylindrical external appearance, and is equipped on the inside thereof with various components, such as, for example, the third moveable lens frame 45x, the fourth moveable lens frame 45y, an AF motor, a zoom motor, a shutter diaphragm unit and the like. The third moveable lens frame 45x and the fourth moveable lens frame 45y retained in the lens frame holder 45 are respectively structured to be able to move by appropriate amounts in a direction along the optical axis O.

Also, the three guide sections 45a are formed at generally equal intervals at predetermined locations along an outer circumferential edge section on the front face side of the lens frame holder 45. The three guide sections 45a freely, slidably engage the three second guide grooves provided in the first moveable lens frame 43, respectively, as described above.

A first cam frame stopper 45c is integrally formed with the lens frame holder 45 at a predetermined location on the outer circumferential surface and closer to the rear end thereof. The first cam frame stopper 45c abuts against a first cam frame stopper receiving section 46c that is provided at a specified location on the inner circumferential surface of the cam frame 46 to thereby control movements of the cam frame 46 in the optical axis direction.

The cam frame 46 is formed from a cylindrical member, and is provided with cam grooves 46a and 46b on the inner circumferential surface and on the outer circumferential surface thereof, respectively. A gear section 46e, which defines a part of a driving power transmission system that transfers driving power from a predetermined driving system (not shown) to rotate the cam frame 46, is formed on the outer circumferential surface at the rear most end section of the cam frame 46.

The fixed frame 47 is formed from a cylindrical tube member with one end thereof being substantially closed. Three mounting-fixing sections 47a are integrally formed with the fixed frame 47 at generally equal intervals on its outer circumferential surface at predetermined locations closer to the rear end thereof. The mounting-fixing section 47a are provided to fixedly support the photographing lens apparatus 10 on the inside of the electronic camera 1. Each of the mounting-fixing section 47a is formed from a circular section 47aa with one portion thereof being cut and a supporting section 47ab. A mounting rubber 51 having a through hole section 51a is attached to the inside of the circular section 44aa. Since the photographing lens apparatus 10 is mounted at a predetermined position on the inside of the electronic camera 1 through the mounting rubbers 51, vibrations and noises that are generated by the moveable frames of the photographing lens apparatus 10 are alleviated.

A foam shock-absorbing member 52 is attached along the entire circumference of the fixed frame 47 at an outer circumferential end section adjacent to one end section thereof. The shock-absorbing member 52 shields gaps that may be created at certain locations between the end section of the fixed frame 47 and the front cover 2 of the electronic camera 1, when the photographing lens apparatus 10 is attached to the electronic camera 1.

A second cam frame stopper receiving section 47d, which serves as a second cam frame stopper, is provide at a predetermined location of a wall surface on the rear end side of the fixed frame 47. When the cam frame 46 moves in the optical axis direction, a rear end edge section 46d of the cam frame 46 abuts against the second cam frame stopper receiving section 47d whereby movements of the cam frame 46 in the optical axis direction are restricted.

A photographing element 39 is affixed to a generally central area of the rear end face of the fixed frame 47. The photographing element 39 is disposed in a manner that a generally center section of the light receiving surface of the photographing element 39 generally coincides with the optical axis O of the photographing lens apparatus 10.

Also, a sound insulation wall 47b is provided along generally the entire circumference of the fixed frame 47 at an outer circumferential end section on the rear most end side thereof. FIG. 8 shows a perspective view of the fixed frame 47 alone, with a view adjacent to the rear end section thereof (as viewed in a direction indicated by an arrow Y of FIG. 4). The sound insulation wall 47b is formed by extending the rear end section of the fixed frame 47 to an area adjacent to a photographing substrate (not shown) on which the photographing element 39 is mounted. By so doing, the sound insulation wall 47b shields mechanical noises generated within the photographing lens apparatus 10 so that the noises do not leak outside the photographing lens apparatus 10.

A driving gear 54 is freely, rotatably provided at a predetermined location in the rear end face at the outer circumferential edge section of the fixed frame 47. The driving gear 54 forms a part of the driving system including a driving motor (an AF or zoom motor that is not shown) provided on the inside of the photographing lens apparatus 10. The driving gear 54 is entirely covered by a sound insulation cover 53. A shaft section 53a is provided on the inside of the sound insulation cover 53. The shaft section 53a freely, rotatably supports the driving gear 54 as an axis, and engages an aperture section 47e that is provided at the rear end section of the fixed frame 47. By this, the sound insulation cover 53 shields mechanical noises generated by the driving gear 54.

The fixed frame 47 is formed by a material different from the material of the respective frame members described above. More specifically, each of the frame members that compose the photographing lens apparatus 10, which includes the fixed frame 47, is formed by, for example, using polycarbonate. However, the fixed frame 47 is formed from a material having a relatively high hardness (a high natural frequency) because it is a member that is disposed at the outermost circumferential side and needs to shut off mechanical noises generated in the photographing lens apparatus 10. More concretely, the fixed frame 47 is formed from a material that contains a slightly greater amount of glass component compared to the other frame members.

As described above, the cam frame 46 is disposed inside the first moveable lens frame 43 in a manner freely movable in a direction along the optical axis O. It is noted that, in a conventional photographing lens apparatus, relative positioning between the cam frame 46 and the first moveable lens frame 43 is generally performed by means of cam-coupling of the cam grooves 46a on the outer circumferential side of the cam frame 46 and the cam pins 43c on the first moveable lens frame 43. Moreover, when a lens barrel is manufactured as an ordinary formed product, its cross section is generally formed to have a sloped configuration. More specifically, the first moveable lens frame is normally formed to have a configuration in a manner that the inner wall surface thereof is downwardly sloped toward the front face side.

The first moveable lens frame 43 manufactured in this manner has a thickness measurement adjacent to the front end section thereof different from a thickness measurement adjacent to the rear end section. As a result, gaps between the cam frame 46 that moves in the first moveable lens frame 43 in a direction along the optical axis O and the inner wall surface of the first moveable lens frame 43 become different when the cam frame 46 is located close to the rear end section of the first moveable lens frame 43 compared to when the cam frame 46 is located close to the front end section of the first moveable lens frame 43. As a result, depending the manufacturing accuracy of the members at the time of manufacturing, the cam frame 46 may not smoothly slide as the cam frame 46 moves from areas adjacent to the front end section of the first moveable lens frame 43 toward areas adjacent to the rear end section thereof. Then, when the cam frame 46 is located adjacent to the read end section of the first moveable lens frame 43, the cam-engagement between the cam grooves 46a and the cam pins 43c may not be securely maintained, and there is a possibility that the cam pins 43c may dislocate from the cam grooves 46a.

Accordingly, in the photographing lens apparatus 10 of the present embodiment, for example, a slide molding apparatus may be used when the first moveable lens frame 43 is manufactured, in order to form a configuration in which the inner wall surface of the first moveable lens frame 43 lays in parallel with the optical axis O, in other words, the cross-sectional configuration of the first moveable lens frame 43 does not have a slope. By forming the first moveable lens frame 43 in this manner, the photographing lens apparatus 10 of the present embodiment improves the coupling accuracy and sliding movement accuracy between the first moveable lens frame 43 and the cam frame 46.

Figure 9:
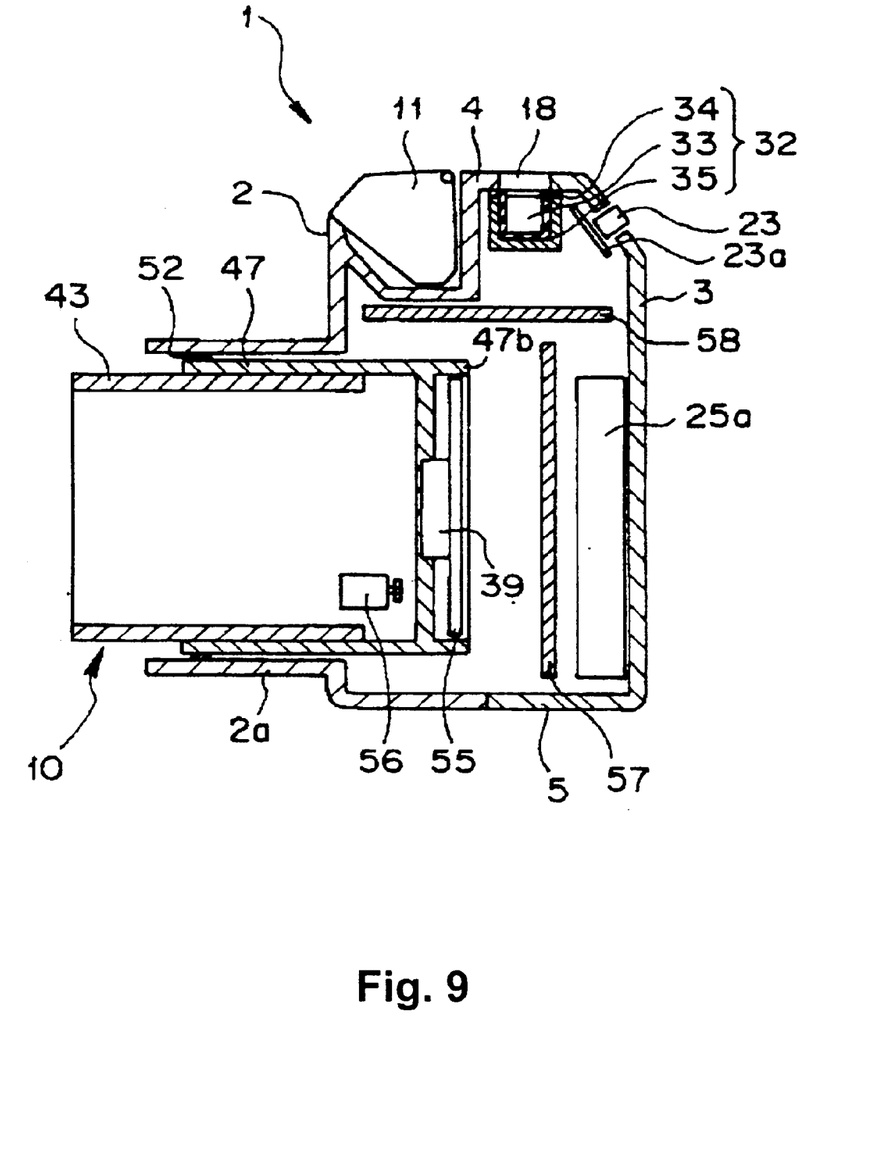
FIG. 9 schematically shows a member placement view indicating positions of key internal components inside an electronic camera as viewed from a side of the electronic camera in which the photographing lens apparatus in accordance with the first embodiment is applied.

FIG. 9 illustrates a component placement figure, as viewed from the side toward the electronic camera 1 in which the photographing lens apparatus 10 of the present embodiment is applied. The figure schematically shows placements of key components disposed in the camera. To avoid complexities in the illustration, FIG. 9 illustrates only the key components presented in rough configurations.

As shown in FIG. 9, the photographing lens apparatus 10 (an illustration of its detailed structure is omitted in FIG. 9) of the electronic camera 1 is disposed inside a sleeve section 2a that is formed in the front face of the front cover 2. A driving motor 56, which serves as a driving source for moving specified frame members in a direction along the optical axis O for the barrel retraction operation, zooming operation and focusing operation, is disposed on the inside of the photographing lens apparatus 10. The driving motor 56 corresponds to an AF motor or a zoom motor that is fixedly mounted on the lens frame holder 45 described above.

As described above, the foam shock-absorbing member 52 is attached along the entire circumference of the fixed frame 47 at the outer circumferential end section adjacent to one end section thereof. The shock-absorbing member 52 is provided to support the fixed frame 47 such that an end section of the fixed frame 47 does not have looseness due to the gap between the fixed frame 47 and the sleeve section 2a of the front cover 2.

In the meantime, a photographing substrate 55 for mounting the photographing element 39 thereon is disposed at the rear section of the photographing lens apparatus 10. The photographing substrate 55 is affixed to the rear end section of the fixed frame 47. The light receiving surface of the photographing element 39 mounted on the photographing substrate 55 faces frontward of the electronic camera 1 and disposed in a manner that a generally central position of the light receiving surface is perpendicular to the optical axis O of the photographing lens apparatus 10.

A main substrate 57, which is a key circuit substrate with a control circuit being mounted thereon for the electronic camera 1, is disposed further in the rear of the photographing substrate 55 in the housing body of the electronic camera 1. Then, a picture display apparatus 25a is disposed further in the rear of the main substrate 57 at a predetermined location closer to the rear face of the electronic camera 1.

In the meantime, an emitting section of the flash emitting apparatus 11 and the viewfinder apparatus 31 (see FIGS. 1 and 2) as well as a microphone unit 32 are disposed at predetermined locations on the rear face side closer to the upper face within the housing body of the electronic camera 1. A power supply strobe substrate 58 with a power supply circuit and a flash emitting circuit mounted thereon is provided below these components described above in parallel with the upper face or the lower face of the camera housing body, in other words perpendicular to a plane in which the main substrate is disposed.

As shown in FIG. 9, a flexible printed substrate 23a with operational members 23 and switch sections interlocked with the operational members 23 mounted thereon is disposed in the housing body of the electronic camera 1 at a predetermined location in the rear face side closer to the upper face.

The microphone unit 32 is disposed at a predetermined location in the rear of the flash emitting apparatus 11. The microphone unit 32 is formed from components of a microphone main body 33 that serves as a voice input section. An outer circumferential surface of the microphone main body 33 is covered by microphone rubber 34, which are, in this state, disposed inside a microphone retaining member 35 that is integrally formed with the upper cover 4.

In this case, the microphone main body 33 is disposed to face toward the upper face of the electronic camera 1, and the microphone aperture section 18 described above is provided as shown in FIG. 1 in the upper cover 4 at a predetermined location opposing to the microphone main body 33.

As described above, the sound insulation wall 47b is provided at the rear most end section of the fixed frame 47. The sound insulation wall 47b extends to an area adjacent to the photographing substrate 55. This structure is provided to shield to prevent mechanical noises generated in the photographing lens apparatus 10 from leaking outside of the photographing lens apparatus 10. As a result, when a specified voice recording operation is performed, mechanical noises generated in the photographing lens apparatus 10 are prevented from traveling through the interior of the electronic camera 1 and reaching the microphone unit 32, such that unnecessary voice information is not recorded.

As described above, in accordance with the first embodiment of the present invention, the shaft fixing section 43a is disposed such that at least a part thereof overlaps a projected plane of the first lens 101a (a large aperture lens) as viewed from its front face side among the plurality of lenses retained by the object lens retaining frame 42 (a moveable lens frame), and at the same time the shaft fixing section 43a is provided adjacent to an outer peripheral section of the third lens 101c (a small aperture lens) among the plurality of lenses retained by the object lens retaining frame 42.

Therefore, this contributes more to the miniaturization of the apparatus, compared to cases where the shaft fixing section 43a is disposed outside a projected plane of the first lens 101a as viewed from its front face side, in other words, at a position outside the outer peripheral section of the lens 101a so as not to overlap the projected plane of the first lens 101a, or the shaft fixing section 43a is provided at a position in the rear of the outer peripheral section of the lens 101a.

In other words, attention is paid to an aspect in which the object lens retaining frame 42 is equipped integrally with the plurality of lens of different apertures, and a difference in the lens apertures created by the plurality of lenses is utilized to thereby provide the shaft fixing section 43a on the inner side of the first moveable lens frame 43 (a moveable lens frame). By composing the apparatus in this manner, miniaturization of the apparatus can be readily attained and deteriorations of the optical performance are suppressed without affecting subject pictures, and the design of the external appearance of the apparatus would not be degraded.

Moreover, the diaphragm member 48 is provided at a predetermined location between the first lens 101a (a large aperture lens) and the third lens 101c (a smaller aperture lens) among the plurality of lenses of different apertures. The diaphragm member 48 restricts light fluxes incident upon the plurality of lenses, and at the same time shields the shaft fixing section 43a such that the shaft fixing section 43a cannot be viewed when viewed from the front face side of the apparatus. Accordingly, when the photographing lens apparatus 1 is viewed from the front face side of the photographing lens apparatus 1, the components inside the apparatus cannot be viewed. This eliminates causes that deteriorate the optical performance, such as, incidence of unnecessary rays of light and harmful internal light reflection.

Further, since the shaft 49 is affixed to the shaft fixing section 43a by press fitting or bonding with adhesive, the shaft 49 can be securely supported. As a result, the predetermined moveable lens frames of the second moveable lens frame 44 can be securely and accurately moved in a direction along the optical axis, and therefore good subject pictures can always be obtained.

Furthermore, the sleeve bearing 44d is provided with an opening section, i.e., the second window 44g (an adhesive observation window) that exposes part of the outer circumferential surface of the sleeve mounted in the sleeve bearing 44d so that the state of penetration of adhesive for affixing the sleeve 50 to the sleeve bearing 44d can be visually confirmed when the sleeve 50 is affixed to the sleeve bearing 44d by the adhesive. Therefore, during the process of manufacturing a lens frame guiding device for the photographing lens apparatus 10, when the bonding work is performed in a state in which the sleeve 50 is mounted on the sleeve bearing 44d, the bonding work can be performed while the state of penetration of the adhesive is visually observed. This can contribute to the improvement in the workability of such a work.

In the photographing lens apparatus 10 in accordance with the first embodiment described above, the outer peripheral section of the fixed frame 47 on the rear most end side thereof is extended to form the sound insulation wall 47b. Further, the sound insulation wall 47b is formed to have a configuration in which it extends to an area adjacent to the photographing substrate 55 that is affixed to the rear end section of the photographing lens apparatus 10.

Since various electronic parts are normally mounted on the surface of the photographing substrate 55, there is a gap between the end section of the sound insulation wall 47b and the surface of the photographing substrate 55. Accordingly, the fact that mechanical noises generated inside the photographing lens apparatus 10 may slightly leak out is undeniable.

A second embodiment of the present invention to be described below provides an example in which mechanical noises generated inside the photographing lens apparatus 10 are more securely insulated.

Figure 10:
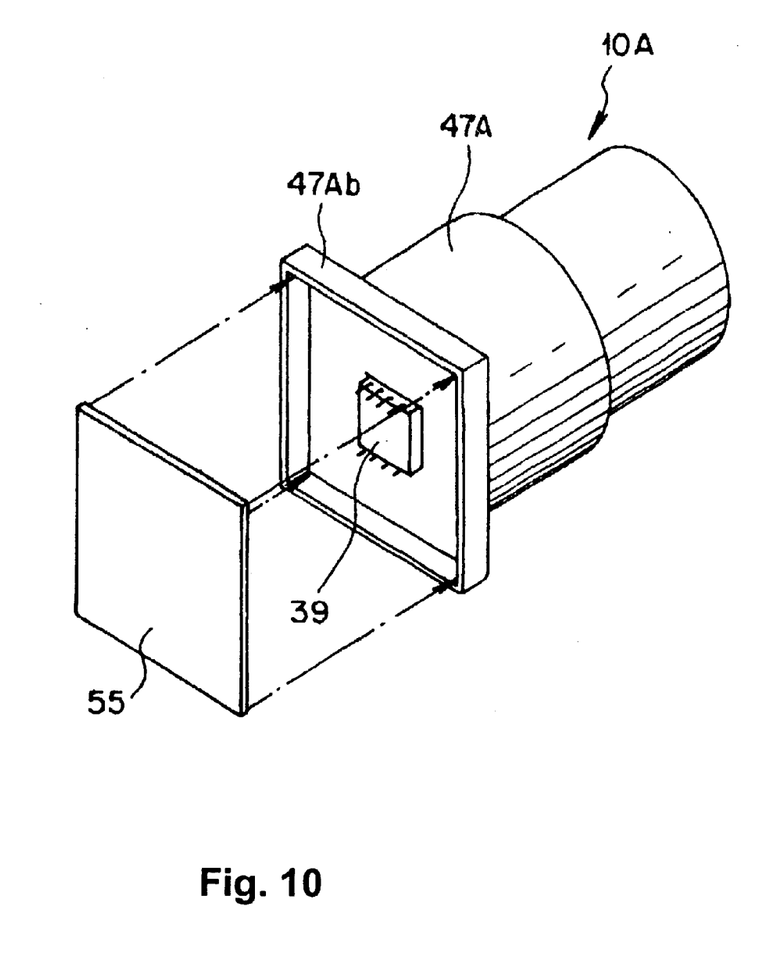
FIG. 10 schematically shows a perspective view of a photographing lens barrel frame with a view of a rear end section thereof in an electronic camera in accordance with a second embodiment of the present invention.

FIG. 10 shows a perspective view of a photographing lens apparatus in accordance with the second embodiment of the present invention, illustrating a state in which the photographing lens apparatus is viewed from the rear side.

The photographing lens apparatus 10A of the second embodiment is provided with a fixed frame 47A having a sound insulation wall 47Ab whose shape is the only difference from the photographing lens apparatus 10 described above.

More specifically, in the photographing lens apparatus 10A, the sound insulation wall 47Ab is formed at the rear most end section of the fixed frame 47A of the photographing lens apparatus 10A at its outer peripheral section. The sound insulation wall 47Ab is formed into a configuration that is capable of covering substantially the entire peripheral section of the photographing substrate 55 that is affixed to the rear end section of the photographing lens apparatus 10A. Other structures are exactly the same as those of the first embodiment described above.

When the photographing substrate 55 is mounted to the rear end section of the photographing lens apparatus 10A, the wall section of the sound insulation wall 47Ab is disposed in a manner extend along the peripheral section of the photographing substrate 55.

By providing the structure described above, the photographing lens apparatus 10A can further reduce the gap that may be created between the photographing substrate 55 and the sound insulation wall 47Ab. This can further improve the effect of insulating mechanical noises that are generated inside the photographing lens apparatus 10A.

As described above, in accordance with the present invention, in photographing lens apparatuses that are equipped with moveable lens frames, there is provided a photographing lens apparatus that can suppress deteriorations of the optical performance resulting from mechanical deviations that may occur as a result of movements of the lens frames, and realizes miniaturization of the entire size of its lens barrel.

In addition, various modifications are enabled within a range that does not deviate from the thrust of the present invention.

It is apparent that a wide variety of working modes are enabled through the use of invention without departing from the spirit and scope of the invention. This invention is not restricted by any specific embodiment except as limited by the appended claims.

What is claimed is:

1. A photographing lens apparatus, comprising:
an object lens retaining frame that integrally retains a plurality of lenses of different apertures and a diaphragm member disposed between a lens of a large aperture located at a front most position and a lens of a smaller aperture located at a position in the rear of the front most position among the plurality of lenses of different apertures;
a first moveable lens frame that is moveable in a photographing optical axis direction and has a mounting section to which the object lens retaining frame is mounted and a shaft fixing section to which a shaft extending in parallel with the photographing optical axis direction is affixed, the shaft fixing section having at least a portion overlapping a projected plane defined by an external shape of the lens of a larger aperture retained by the object lens retaining frame as viewed from a front face side of the lens of a large aperture and being provided at a specified location within a region adjacent to an outer peripheral section of the lens of a smaller aperture; and
a second moveable lens frame having a sleeve that freely, slidably engages the shaft and allows a group of moveable lenses different from the plurality of lenses of different apertures to move in the photographing optical axis direction.

2. A photographing lens apparatus according to claim 1, wherein the diaphragm member has a rectangular opening section.

3. A photographing lens apparatus according to claim 1, wherein the shaft fixing section is provided adjacent to the diaphragm member.

4. A photographing lens apparatus according to claim 1, wherein the shaft is affixed to the shaft fixing section by press fitting or bonding.

5. A photographing lens apparatus according to claim 1, wherein the second moveable lens frame has a sleeve bearing section that extends in the photographing optical axis direction, and the sleeve is bonded to the sleeve bearing with adhesive.

6. A photographing lens apparatus according to claim 5, wherein the sleeve bearing section includes at least one opening section that exposes a part of an outer circumferential surface of the sleeve that is bonded thereto.

7. A photographing lens apparatus, comprising:
a first moveable lens frame having a shaft fixing section for mounting thereon a shaft that extends in a photographing optical axis direction and being moveable in the photographing optical axis direction;
a second moveable lens frame having a sleeve that freely, slidably engages the shaft, and a member for restricting rotations thereof about the shaft, and being moveable along the photographing optical axis direction inside the first moveable lens frame; and
an object lens retaining frame that is affixed to the first moveable lens frame on an object side thereof, and integrally retains a plurality of lenses of different apertures, the object lens retaining frame including a diaphragm member among the plurality of lenses,
wherein the shaft fixing section is disposed within a projected plane defined by an outer shape of a large aperture lens on the object side and at a specified location in a region adjacent to an outer peripheral section of a small aperture lens among the plurality of lenses retained by the object lens retaining frame.

8. A photographing lens apparatus according to claim 7, wherein the diaphragm member has a rectangular opening section.

9. A photographing lens apparatus according to claim 7, wherein the shaft fixing section is provided adjacent to the diaphragm member.

10. A photographing lens apparatus, comprising:

an object lens retaining frame that integrally retains a plurality of lenses of different apertures and is equipped with a diaphragm member disposed among the plurality of lenses; and a linear movement guiding system including a shaft extending in an photographing optical axis direction and a sleeve that freely, slidably engages the shaft, wherein the shaft is affixed as a cantilever within a projected plane defined by an outer shape of a largest aperture lens located on an object side and at a specified location in a region adjacent to an outer peripheral section of a lens of a small aperture located in the rear of the largest aperture lens among the lenses retained by the object lens retaining frame.

11. A photographing lens apparatus according to claim 10, wherein the diaphragm member has a rectangular opening section.

12. A photographing lens apparatus according to claim 10, further comprising a moveable lens frame equipped with a section to which the shaft is affixed, wherein the object lens retaining frame is attached to the moveable lens frame on an object side thereof.

* * * * *